(12) United States Patent
Fung et al.

(10) Patent No.: US 11,101,837 B2
(45) Date of Patent: Aug. 24, 2021

(54) POUCH WITH VIEWING WINDOWS AND ACCESS OPENINGS

(71) Applicant: WEST COAST CHAIN MFG. CO., Ontario, CA (US)

(72) Inventors: Edwin S. Fung, Walnut, CA (US); Andrew Castañeda, Anaheim, CA (US); Nicholas L. Voss, Riverside, CA (US)

(73) Assignee: West Coast Chain Mfg. Co., Ontario, CA (US)

( * ) Notice: Subject to any disclaimer, the term of this patent is extended or adjusted under 35 U.S.C. 154(b) by 0 days.

(21) Appl. No.: 16/277,909

(22) Filed: Feb. 15, 2019

(65) Prior Publication Data

US 2020/0266844 A1 Aug. 20, 2020

(51) Int. Cl.
*H04B 1/3888* (2015.01)
*A45C 13/00* (2006.01)
*B65D 33/04* (2006.01)
*B65D 33/14* (2006.01)
*A45C 11/00* (2006.01)

(52) U.S. Cl.
CPC ......... *H04B 1/3888* (2013.01); *A45C 13/008* (2013.01); *B65D 33/04* (2013.01); *B65D 33/14* (2013.01); *A45C 2011/002* (2013.01); *A45C 2200/10* (2013.01)

(58) Field of Classification Search
CPC .............. H04B 1/3888; A45C 13/008; A45C 2011/002; A45C 2200/10; B65D 33/04; B65D 33/14
USPC .................................................. 383/9, 106
See application file for complete search history.

(56) References Cited

U.S. PATENT DOCUMENTS

| 989,297 | A | * | 4/1911 | Schaefer | G09F 3/18 40/653 |
| 8,794,495 | B1 | | 8/2014 | Wathen | |
| 2003/0188815 | A1 | * | 10/2003 | Hart | A45C 1/06 150/147 |
| 2004/0033788 | A1 | * | 2/2004 | Price | H04B 1/3888 455/100 |
| 2007/0235493 | A1 | * | 10/2007 | Fortson | A45C 11/00 224/257 |
| 2011/0303579 | A1 | * | 12/2011 | Sanders | A45F 5/00 206/701 |
| 2015/0216276 | A1 | * | 8/2015 | Stratton | A45C 11/00 224/183 |

(Continued)

FOREIGN PATENT DOCUMENTS

GB 2 316 300 A 2/1998

OTHER PUBLICATIONS

PCT International Search Report and Written Opinion for International Application No. PCT/US2020/018412, dated Jun. 29, 2020, 14 pages.

*Primary Examiner* — Jes F Pascua
(74) *Attorney, Agent, or Firm* — Lewis Roca Rothgerber Christie LLP

(57) ABSTRACT

A tethered pouch adapted to carry an device, tool or equipment, has a shell with a proximal opening that leads to an interior pocket, wherein the shell is constructed of a first material and a second material where the second material may be configured as a viewing window and the shell has at least one access opening configured to receive a digit of a user's hand for contacting and operating the item, such as a mobile phone.

22 Claims, 8 Drawing Sheets

(56) References Cited

U.S. PATENT DOCUMENTS

2016/0212252 A1\* 7/2016 Parker ................. H04B 1/3888
2017/0064854 A1\* 3/2017 Hayes ................. H04B 1/3888

\* cited by examiner

POUCH WITH VIEWING WINDOWS AND ACCESS OPENINGS

BACKGROUND

1. Field

Some embodiments of the present disclosure relate generally to tool, device and instrument safety equipment.

2. Description of the Related Art

The construction of high-rise buildings and tall structures poses a particular risk when workers use any objects, such as tools, devices or instruments, from great heights above the ground. An object dropped from an upper floor of a high-rise building could result in serious injury or death if the dropped object were to strike a person. Fall protection violations, including dropped objects, continue to rank high on OHSA's list of violations. In fact, there are more than 50,000 "struck by falling object" OSHA recordables every year in the United States, alone. That is about the equivalent of one injury from a dropped object every 10 minutes.

Unsecured items that can cause serious injury range from heavier objects, such as hammers, to lighter objects, such as tape measures or mobile phones. In fact, a man making a delivery to a construction site in New Jersey was killed by a one-pound tape measure dropped by a worker from 50 stories above. Not only do dropped objects pose a risk to the people below, the person who dropped the object is also at risk, as his first reaction may be to reach for the falling object which may cause him to lose his balance.

Debris nets, toe boards and helmets help but they have their limitations. Effectiveness of debris nets depends on the net hole dimensions, that is, smaller objects can fall through. Toe boards protect only the workers immediately below and can also pose trip hazards for workers. More importantly, both of these safety measures have to withstand considerable force—an eight-pound wrench dropped 200 feet would hit with a force of 2,833 pounds per square inch. A better solution would be to prevent the drop in the first place.

Carrying an instrument, device or tool on the body of a user is known. However, any drop prevention measure should minimize interference with the normal use or function of the instrument, device or tool. Conventional carriers include hard and soft mobile phone, and waterproof mobile phone holders. Such pouches and holders may be carried on a person's belt or his arm and may include see-through panels or windows but they fully encase the mobile phone with zippers and/or hook-and-loop fasteners that typically require two-handed handling to insert or remove the mobile phone. Moreover, these pouches and holders that seal in the mobile phone also tend to hamper operation of many features of the mobile phone unless the phone is removed.

An easy-to-use tethered pouch with access openings and viewing windows is therefore needed that can accommodate a variety of tools, devices or instruments while minimizing the risk of being dropped, where such pouch does not interfere with the normal use of the tool, device or instrument and allows access to features, including optical, audio and/or contact components, of tool, device or instrument, without requiring removal from the pouch.

The above information is only for enhancement of understanding of the background of embodiments of the present disclosure, and therefore may contain information that does not form the prior art.

SUMMARY

Some embodiments of the present disclosure provide a pouch adapted to carry a device, tool or equipment, that secures the item from inadvertently dropping off a person's body but allows the item to function and operate generally in its normal manner while held in the pouch. Where the item being carried is mobile phone, the pouch carries the mobile phone in a manner that allows the user to use the mobile phone, for example, to make calls, text, email, listen to music, record, take photos, illuminate, etc., without removal from the pouch. In some embodiments, the pouch has a shell with a proximal opening that leads to an interior pocket in which an item can be carried. The shell is constructed of a first material and a second material where the second material may be configured as a viewing window into the pocket so that a user can see the item, including graphical user interfaces of the item, while inside the pocket. Moreover, the shell has at least one access opening configured to receive a digit of a user's hand for contacting and operating the item. Each of the first panel and the second panel has a through-opening configured to receive a releasable fastener that is coupled to a tether which can be fastened to the user or a structure.

In some embodiments, the first material is canvas, and the second material is a transparent plastic sheet material.

In some embodiments, the access opening includes a slit opening.

In some embodiments, each of the first and second panel has a generally triangular proximal portion. In some embodiments, the generally triangular proximal portion comprises the first material.

In some embodiments, the pouch has interconnecting members spanning between the first and second panels to connect longitudinal side edges of the panels.

In some embodiments, the interconnecting members have a greater elasticity than the materials of the first and second panels.

In some embodiment, each panel includes a generally rectangular distal portion and a generally triangular proximal portion and each interconnecting member is configured with a proximal end that is distal of a proximal end of the generally rectangular distal portion, thus leaving a space gap sufficient for the insertion of a user's digit in contact the item in the pocket.

In some embodiments, the shell includes apertures configured to pass audio signals between the user and a mobile phone carried in the pouch.

In some embodiments, a pouch configured for tethering has a shell defining a longitudinal axis, the shell having front panel, a back panel and an interconnecting member connecting the front panel and the back panel to define a pocket within the shell. Each of the front and back panel has a generally rectangular distal portion, and a generally triangular proximal portion that adapts the pouch for hanging and dangling with improved stability. In that regard, the generally triangular proximal portion has an apex that lies generally on the longitudinal axis.

In some embodiments, each generally triangular proximal portion has a through-hole generally at the apex, wherein the generally rectangular portion of the front panel comprising viewing window into the pocket and the generally rectangular portion of the back panel comprising a slit opening.

In some embodiments, the generally triangular portions of the front and back panels comprise a first material and the viewing window comprises a second material.

In some embodiments, the first material is canvas and the second material is a transparent plastic material.

In some embodiments, the slit opening is transverse to the longitudinal axis.

In some embodiments, the slit opening comprises an overlap between the first material and the second material. In some embodiments, the overlap comprises an inner distal edge of the first material and an outer proximal edge of the second material.

In some embodiments, the pouch includes a tether having a releasable fastener configured to couple with the through-holes.

In some embodiments, the shell includes apertures to pass audio signals.

In some embodiments, the shell is constructed of a water resistant material.

BRIEF DESCRIPTION OF THE DRAWINGS

Some embodiments can be understood in more detail from the following description taken in conjunction with the accompanying drawings, in which.

DETAILED DESCRIPTION

Figure 1:
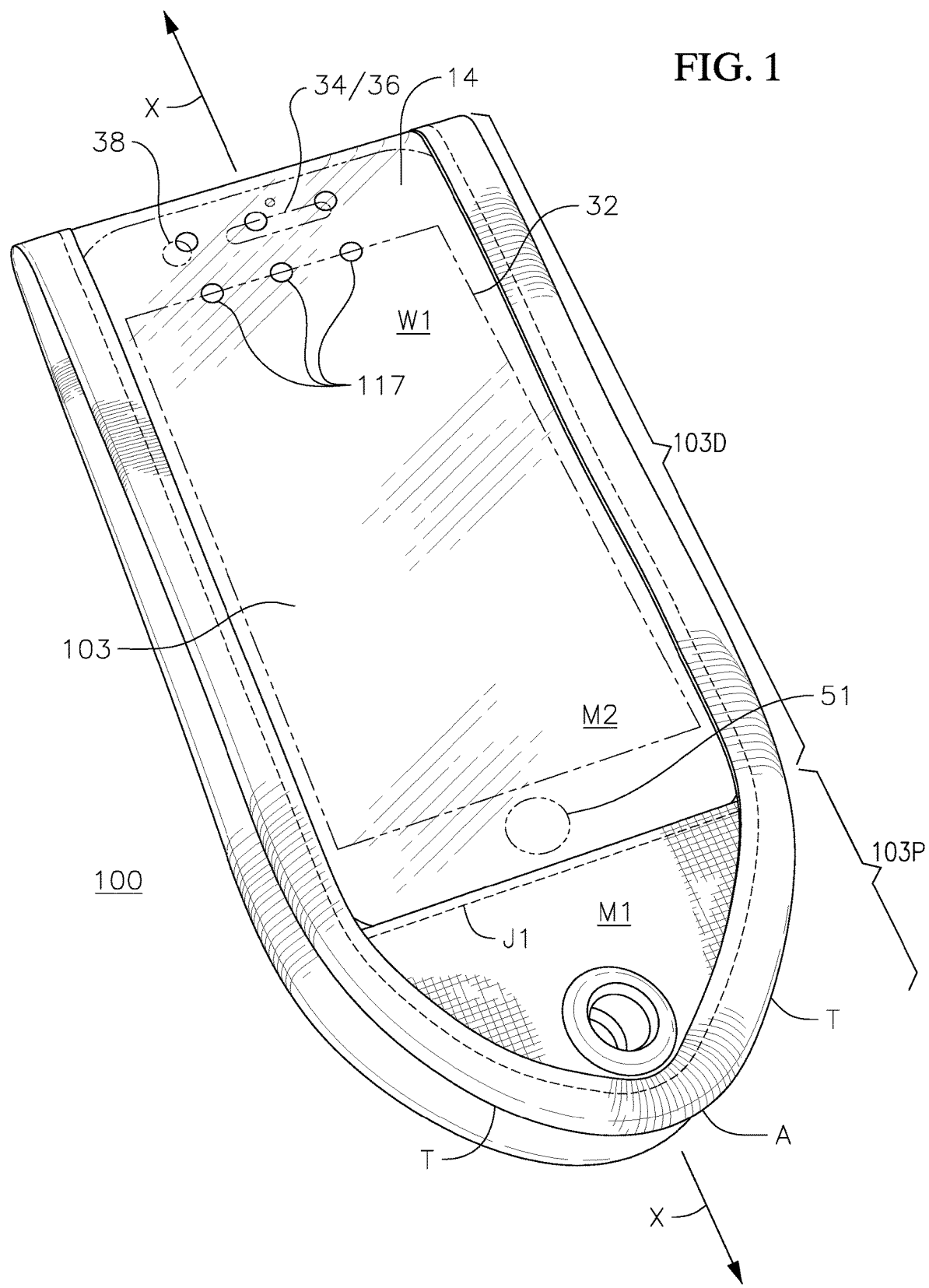
FIG. 1 is a top, front and right perspective view of a pouch, according to an embodiment, as used to hold a mobile phone.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. The drawings are not necessarily to scale and the relative sizes of elements, layers, and regions shown may be exaggerated for clarity.

Figure 2:
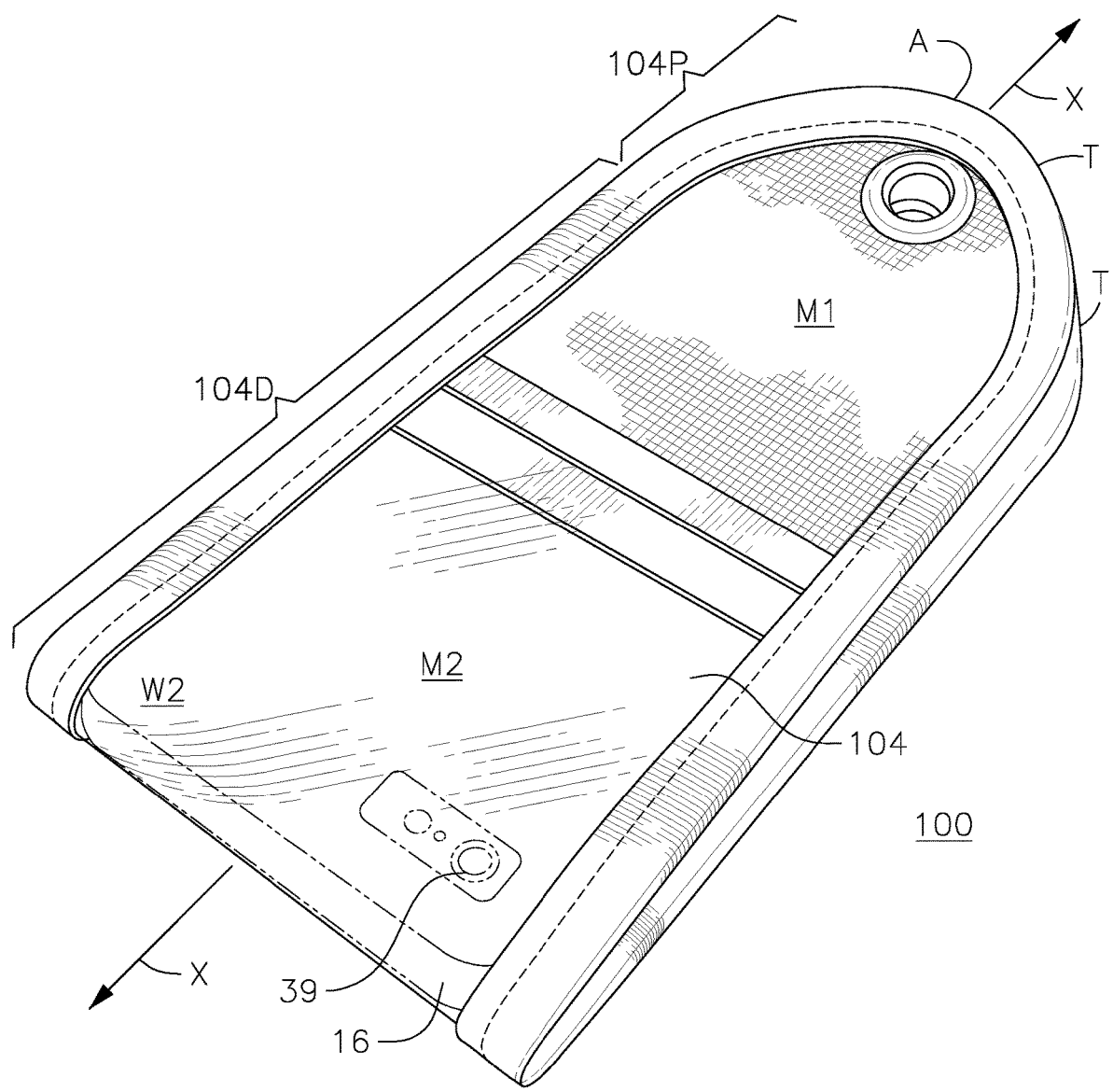
FIG. 2 is a back, rear and left perspective view of the pouch of FIG. 1.
Figure 3:
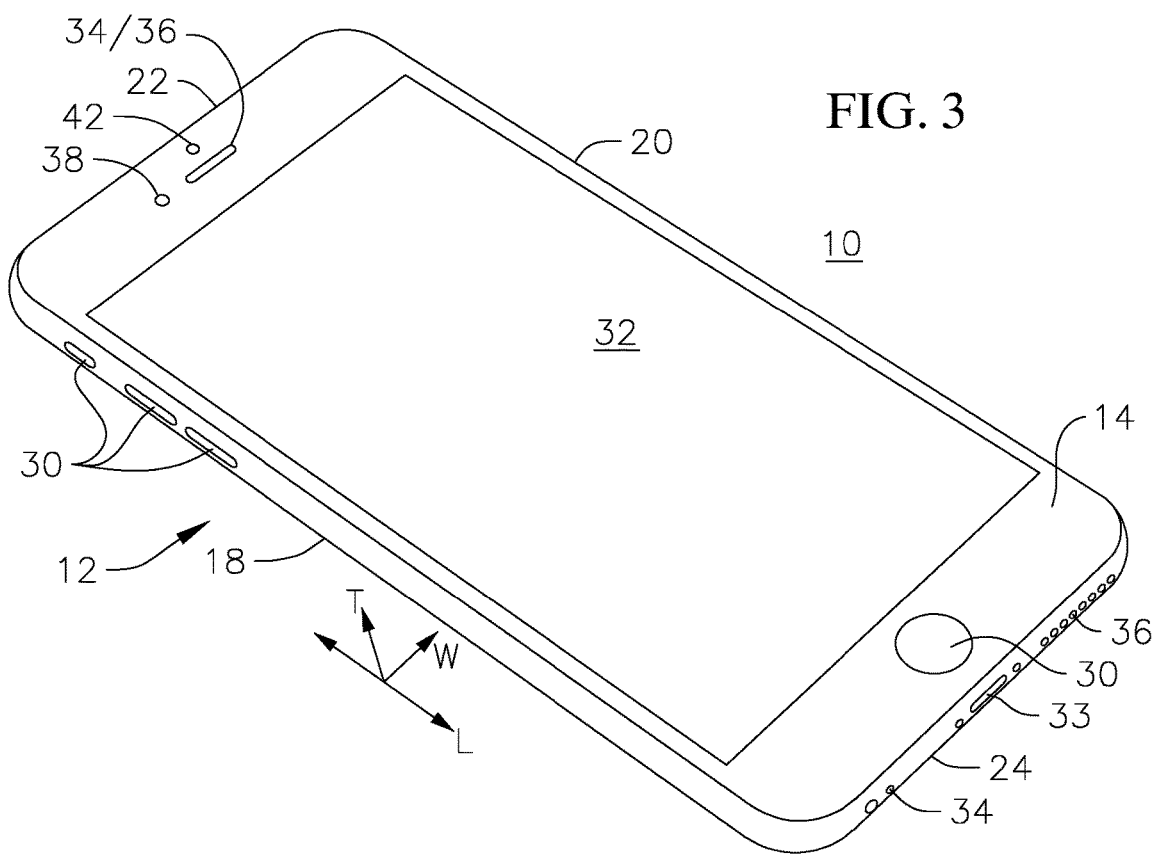
FIG. 3 is front perspective view of a mobile phone.

Embodiments of the present disclosure include a flexible pouch 100, as shown in FIGS. 1 and 2, for containing a useful object, such as a tool, electronic device or instrument, and tethering the pouch to a person, device and/or structure. In various embodiments, the pouch is configured for use with a mobile phone, also commonly referred to as cellular phone or cell phone, that functions primarily as wireless handheld device that allows users to make and receive calls and send text messages, among other functions and features. As shown in FIG. 3, a conventional mobile phone 10 has a generally thin and planar body 12 with a generally rectangular configuration, defined by a length L, a width W and a thickness T. The mobile phone 10 has a front face 14, a back face 16, a first long side 18, a second (opposing) long side 20, a first (upper) short side 22, and a second (lower) short side 24. Depending on the model and make, the mobile phone typically has multiple switches, buttons and/or sensors, collectively referred to herein as actuators 30 that have a variety of functions and operations, for example, turning the mobile phone on or off, turning sound on or off, controlling volume, enabling authentication, and accessing a "home screen." These actuators 30 are typically situated along one or more of the long sides 18, 20, the short sides 22 and 24 and on the front face 14. The mobile phone 10 typically includes one or more of the following features: a graphical user interface or main (touch) screen 32 on the front face 14, a charging port 33 on the lower short side 24, one or more audio components (e.g., microphones 34, a speaker 36, earphone jack 37) on the front face 14 and/or the lower short side 24, one or more optical components (e.g., a first or forward-facing camera lens 38 and a second or rear-facing camera lens 39, a light source 40, and a light sensor 42) on the front face 14, the back face 16 and/or the lower short side 24, and a conductivity sensor (e.g., a fingerprint sensor 43). As such, the pouch 100 advantageously provides a user with visual, auditory and contact access to these actuators and features via one or more access openings and viewing windows configured in the pouch.

Figure 5:
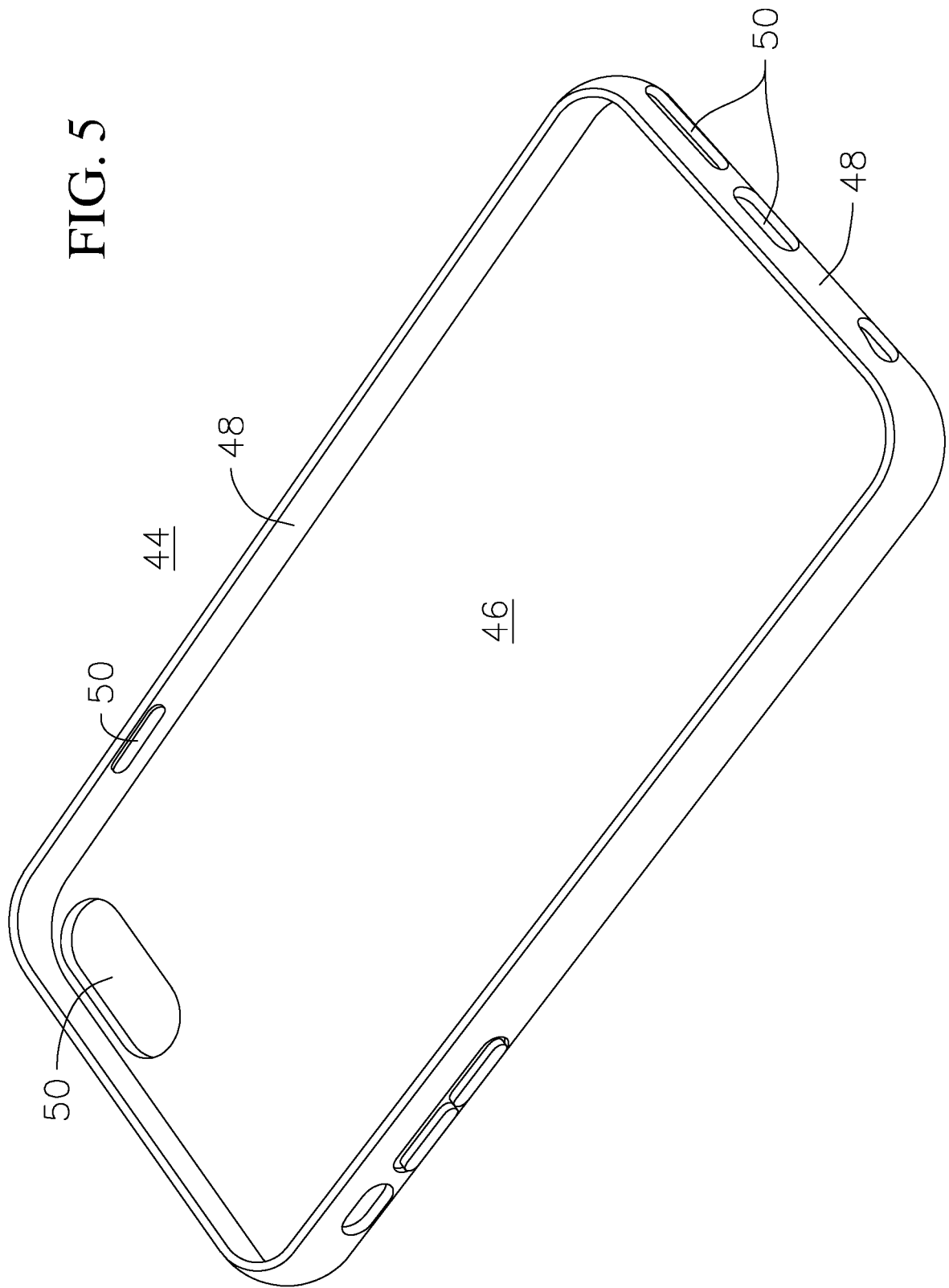
FIG. 5 is a perspective view of a mobile phone case.

In some embodiments, a protective, generally rigid case may be mounted on the mobile phone, as shown in FIG. 5. A conventional protective case 44 typically has a back panel 46 to protect the back face and a peripheral lip 48 that surrounds the long and short sides 18, 20, 22, 24 of the mobile phone 10. The case 44 may be configured with one or more openings, cutouts or through-holes 50 to allow unobstructed access to the various aforementioned actuators and components of the mobile phone.

The pouch 100 is configured to allow easy deposit and removal of the mobile phone (with or without a protective case) in and out of the pouch and to reliably retain the mobile phone in the pouch, but the pouch also includes various elements and features to facilitate generally normal, unobstructed use of the mobile phone while contained inside the pouch.

Figure 6:
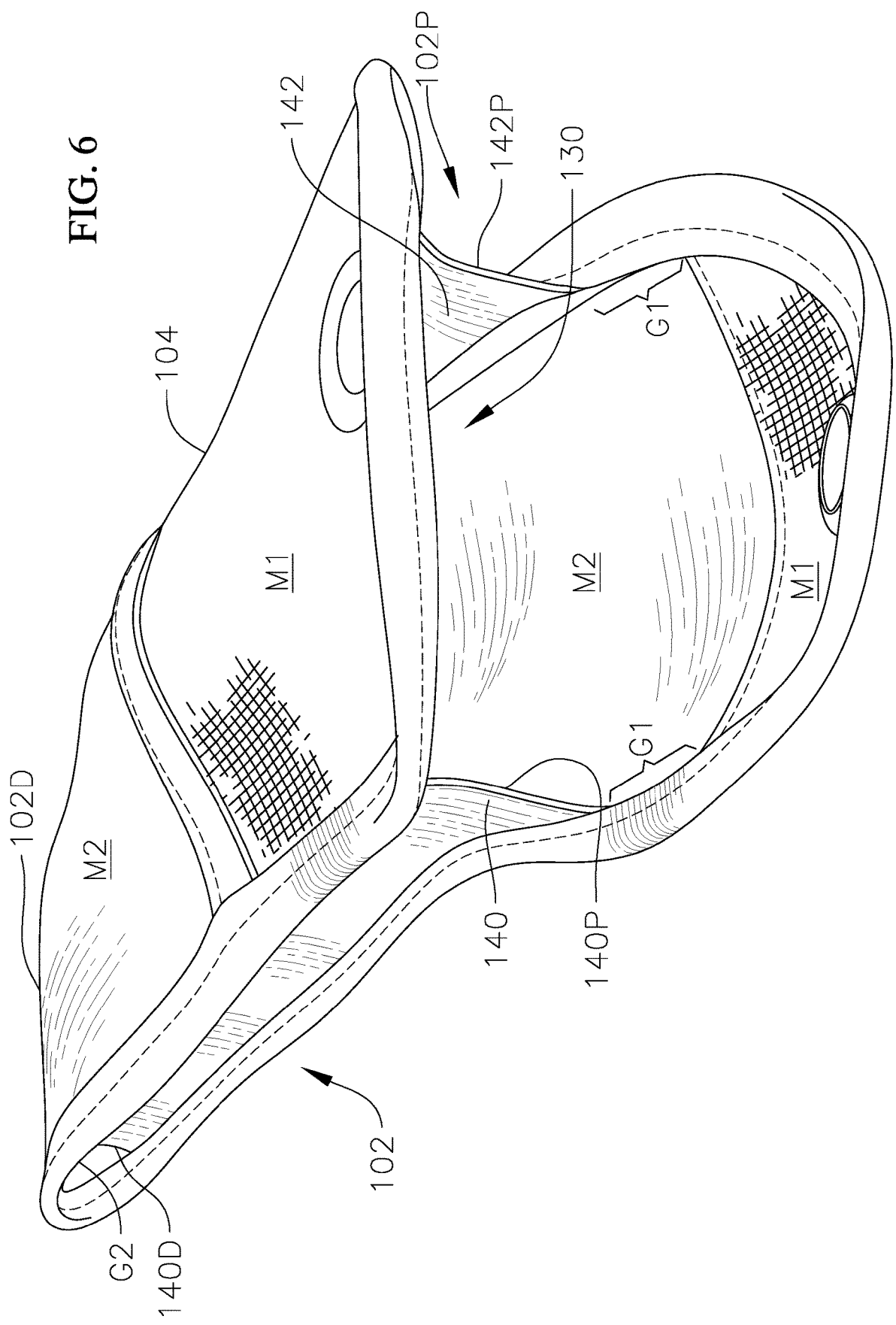
FIG. 6 is a side perspective view of the pouch of FIG. 1, in an open configuration.
Figure 8:
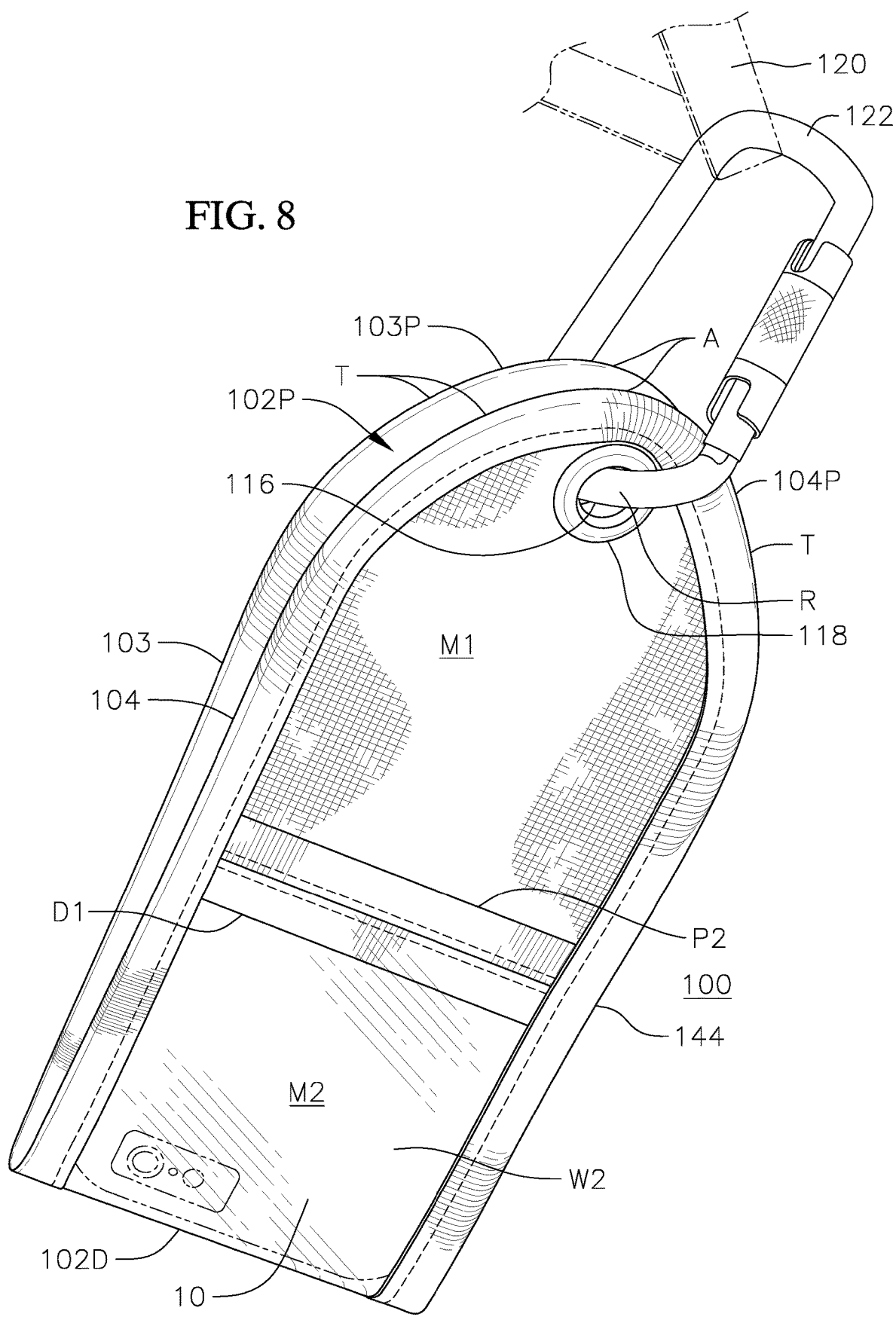
FIG. 8 is a perspective view of the pouch of FIG. 1, with a safety tether.

FIG. 1 and FIG. 2 depict a pouch 100 for a tool, device or instrument, including a personal electronic device such as a mobile phone, according to various embodiments of the present invention. In various embodiments, the pouch 100 may be configured to substantially surround and hold a mobile phone in a pocket 130, as shown in FIG. 6. It is understood that the pouch 100 is suitable for use with a mobile phone 10 whether the mobile phone is with or without a protective case. In various embodiments, the pouch 100 may be configured for attachment to a safety tether 120, as shown in FIG. 8, in a configuration where the pouch has advantageous characteristics and functions, including reliably retaining the mobile phone inside the pouch, enabling normal use of the mobile phone via one or more access openings and viewing windows, preventing the mobile phone from falling when dropped, and hanging in a secured orientation with dampened swing or twisting.

In some embodiments, the pouch 100 includes a shell 102 having a U-shaped configuration with a closed or sealed distal end 102D, and a proximal opening 102P providing access to the pocket 130, perhaps best seen in FIG. 6. The shell has a front panel 103 and a back panel 104 that define the pocket 130 between the panels. In various embodiments, the shell 102 with one or more access openings may be constructed out of a first material M1 that is durable yet flexible, such as nylon, nylon blends and canvas-like nylon fabrics, including, e.g. CORDURA™ by E.I. du Pont de Nemours and Company. In various embodiments, the shell 102 includes at least a second material M2 that occupies one or more strategic, predetermined regions or portions and is nonopaque (for example, translucent or transparent) in providing the pouch with one or more viewing windows into the interior or pocket of the shell. The second material may also be water-resistant, water-proof and/or flexible. A suitable material for the second material M2 includes, for example, plastic sheet, such as PVC or TPU. As such, both the first material and second material can provide a barrier against the environment in minimizing damage to the mobile phone from scratches and water/moisture exposure, while the second material also allows visual access into the pocket 130 and the mobile phone 10 inside the pouch 100.

In some embodiments, the shell 102 of the pouch 100 is shaped and/or sized to accommodate the mobile phone in the pocket 130 with a close fit, with each panel 103, 104 being generally of the same shape and size to each other and to the mobile phone.

In some embodiments, each panel 103, 104 has an overall length L of about 7.5 inches along a center longitudinal axis X, and a transverse width W of about 3.5 inches, where each panel 103, 104 includes a generally-rectangular distal portion 103D, 104D of about 6.0 inches in length and 3.5 inches in width, and a generally-triangular proximal portion 103P, 104P of about 1.5 inches in length along the longitudinal axis X, that is oriented with edges T tapering to a proximal apex A that intersects the longitudinal axis X.

In some embodiments, as shown in FIG. 1, the second (nonopaque) material M2 spans the entirety of the generally rectangular distal portion 103D, and the first material M1 spans the entirety of the generally triangular proximal portion 103P. In some embodiments, as shown in FIG. 2, the second material M2 spans a distal half of the generally rectangular distal portion 104D and the first material M1 spans the entirety of the proximal portion 104P and also a proximal half of the generally rectangular distal portion 104D. Accordingly, the pouch 100 is provided with at least a larger viewing window W1 (FIG. 1) on the front panel 103 to correspond with and accommodate the main screen 32 of the mobile phone and the camera lens 38, and the pouch 100 is also provided with a smaller viewing window W2 (FIG. 2) on the back panel 104 to correspond with and accommodate the camera lens 39.

In some embodiments, the second material M2 is configured as a continuous sheet spanning the windows W1 and W2 and bridging distal ends 103D, 104D of the front and back panels 103 and 104 in providing the U-shaped configuration. In some embodiments, the second material M2 is configured with small through-apertures 117 (FIG. 1) at locations that correspond to audio components (e.g., speaker/microphone 34/36 of the mobile phone 100 so as to facilitate transmission of audio signals and voice commands between the mobile phone and the user.

In some embodiments, the pouch 100 includes one or more interconnecting members 140, 142, perhaps best seen in FIG. 6, spanning between and connecting the front and back panels 103, 104 along the panels' longitudinal edges. The members 140 and 142 have dimensions that provide the pouch with a close fit around the mobile phone yet strategically facilitate a user in accessing the mobile phone inside the pouch via access openings. In that regard, the interconnecting members are constructed of an elastic material or a material with greater elasticity than the materials of the shell 102. In some embodiments, the elastic material is also sufficiently flexible and of sufficiently thin construction to allow a user to operate (e.g., depress, toggle or otherwise move) various actuators of the mobile phone via contact on the outer surface of the elastic material without direct contact with the actuators. In some embodiments, each interconnecting member 140, 142 has an exposed width that spans about 0.5 inches between the front and back panels 103, 104 (and a stretch capacity to about 1.0 inch). Each interconnecting member may also have a length of about 4.5 inches, wherein the interconnecting members are configured so that their proximal ends 140P, 142P are distal of the proximal end of the distal portions 103D, 104D, respectively by a first gap space G1 (see FIG. 6). The first gap space G1 functions as an access opening in providing an opening to allow the user to readily and comfortably insert a digit, including a thumb or a finger, to access and contact the mobile phone, for example, a home button 51 (FIG. 1), even where the safety tether 120 is fastened to the pouch 100.

In some embodiments, a second gap space G2 (see FIG. 6) as another access opening may be provided at distal ends 140D, 142D of each interconnecting member 140, 142 to enable a user to insert a digit, including a finger to access actuators near corners of the upper short side 22 of the mobile phone.

Figure 4:
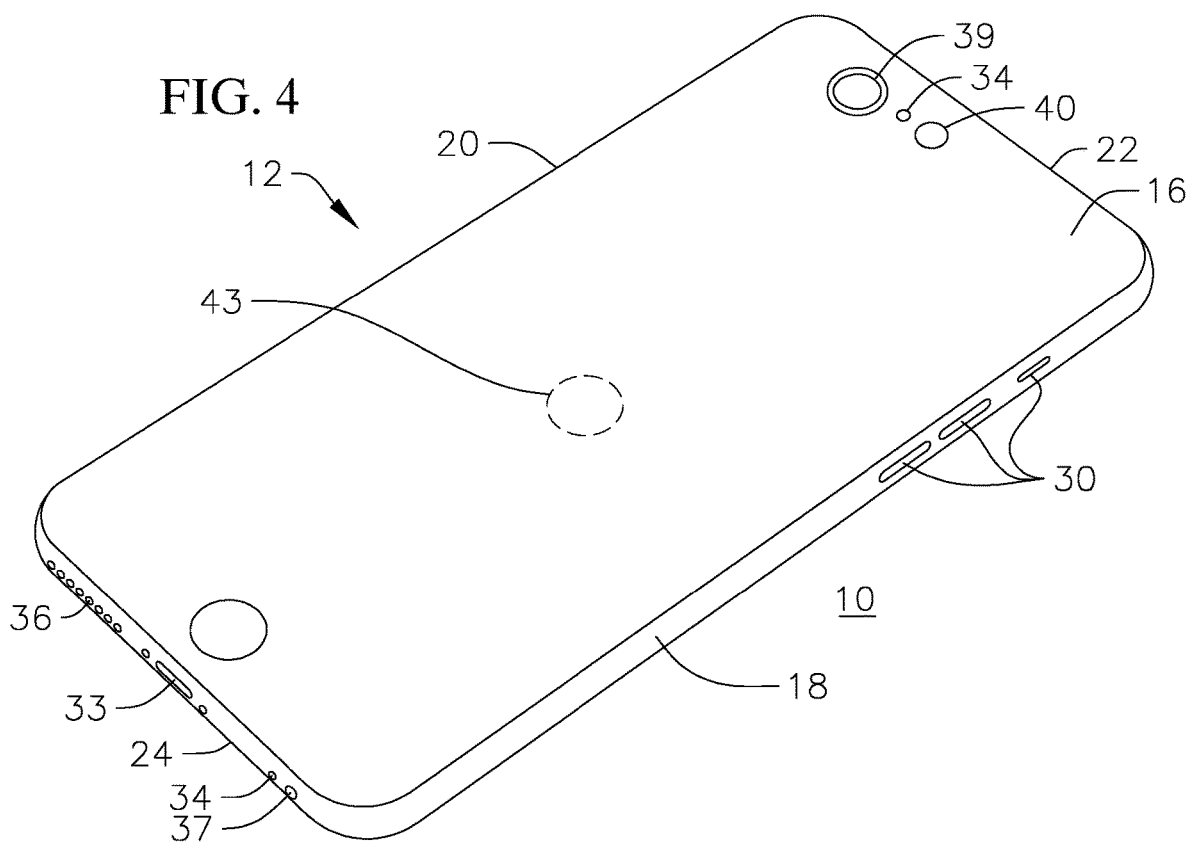
FIG. 4 is a back perspective view of the mobile phone of FIG. 3.
Figure 7:
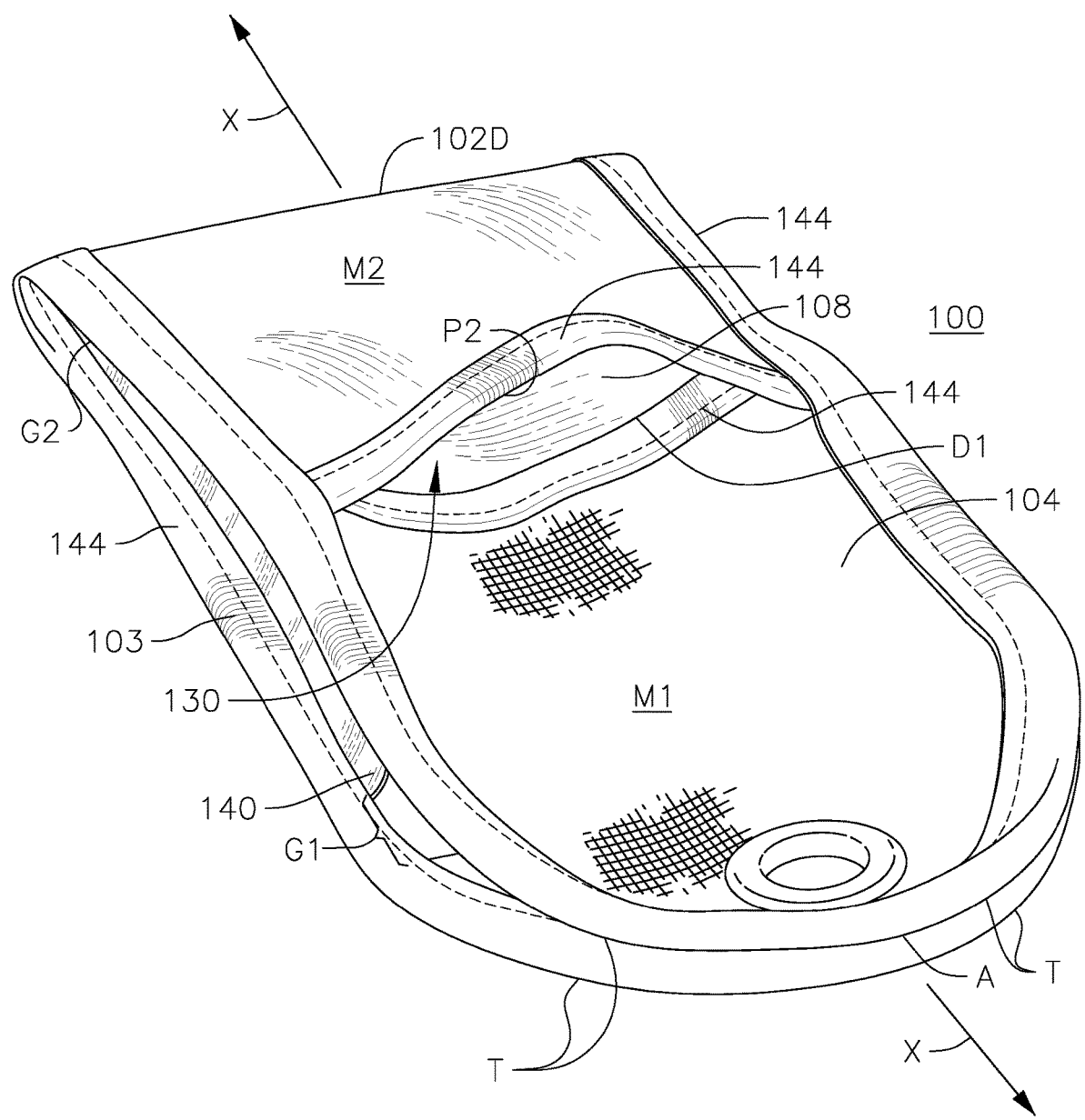
FIG. 7 is a side perspective view of the pouch of FIG. 1, in a closed configuration.
Figure 9:
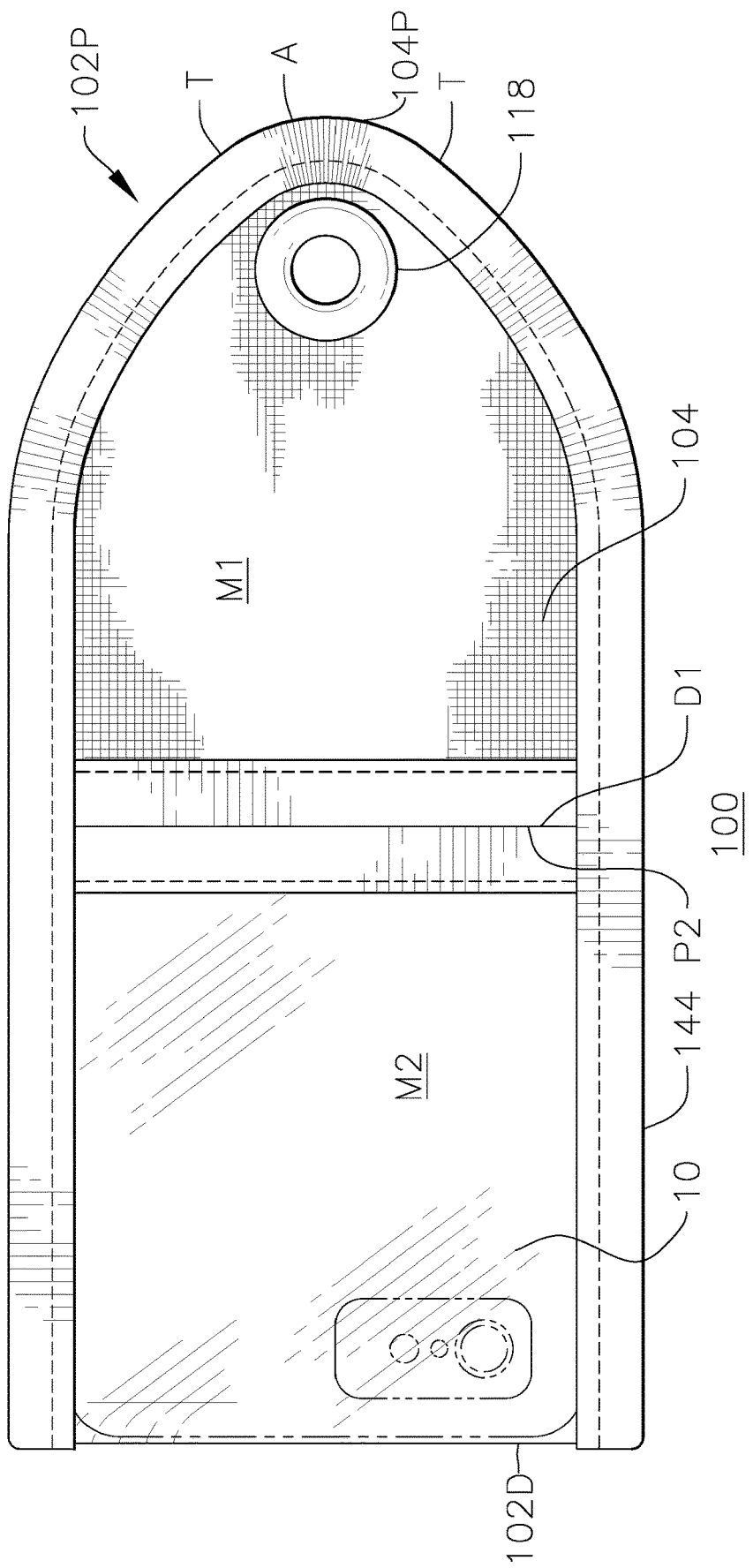
FIG. 9 is a perspective view of a pouch, according to another embodiment.

In some embodiments, on the front panel 103 of the shell 102, a distal edge of the first material M1 (for example, occupying the generally triangular proximal portion 103P) and a proximal edge of the second material M2 (for example, occupying the generally rectangular distal portion 103D) may be joined and affixed to each other along junction J1 (FIG. 1) by any suitable means, for example, stitching, adhesive and/or thermal fusion. On the back panel 104, a slit opening 108 (FIG. 7), as yet another access opening, is provided between a distal edge D1 of the first material M1 (for example, occupying the generally triangular proximal portion 104P and the proximal half of the generally rectangular distal portion 104D) and a proximal edge P2 of the second material M2 (for example, occupying the distal half of the generally rectangular distal portion 104D). The slit opening 108 may be formed as a transverse slit opening (generally orthogonal to the longitudinal axis X) by overlapping the distal edge of the first material M1 and the proximal edge of the second material M2 by a predetermined amount, for example, ¾ inch. In some embodiments, the distal edge D1 is inside of the outer proximal edge P2, where the distal edge D1 is "tucked" beneath the proximal edge P2. As described below in further detail, the overlap and tucking of the distal edge of the first material M1 allows the mobile phone to readily slide past the slit opening 108 without catching on the proximal edge of the second material M2, especially as the mobile phone is inserted into the pouch. In other embodiments, as shown in FIG. 9, the distal edge of the first material M1 abuts with the proximal edge of the second material M2, with no overlap therebetween, although the width of the slit opening may be smaller in not extending the entire width of the back panel 104. In any case, the slit opening 108 situated between the materials M1 and M2 advantageously allows a user to insert a digit or finger, for example, to access the conductivity sensor 43 (FIG. 4) and provide a fingerprint for scanning by the mobile phone, while allowing the user to see the placement of his digit or finger on the mobile phone.

As shown in FIG. 8, near each apex A of each proximal portion 103P, 104P, a through-hole 116 is provided. Each through-hole 116 may be reinforced a grommet 118 or by any other suitable means, for example, by stitching, sealant and/or thermal fusion. The through-hole and is configured to receive the safety tether 120 which may be, for example, a lanyard or a cord, and includes a releasable fastener 122, for example, a carabiner, configured to releasably couple the through-holes 116. Coupling the through-holes 116, the releasable fastener 122 can draw together the proximal portions 103P, 104P and close the proximal opening 102P of the pouch thereby reliably trapping the mobile phone 10 inside the pouch 100, particularly where the pouch is hanging freely under the force of gravity so that the proximal portions 103P, 104P are at a higher elevation than the rest of the pouch 100. In that regard, each through-hole 116 advantageously lies on the longitudinal axis X so that the pouch, especially with the weight of the mobile phone in the pocket 130, can hang vertically along a plum line from the safety tether 120. With the triangular configuration of the proximal portions 103P, 104P being parallel with each other, and the apices A and through-holes 116 being at the highest elevation relative to the rest of the pouch, the proximal portions 103P, 104P help stabilize the pouch 10 and and/or dampen excessive swing or twisting motion of the pouch 100 when hanging from the tether. In that regard, the releasable fastener 122 may have a rigid portion R extending transversely through the through-holes 116 to minimize the ability of the proximal portions 103P, 104P to shift laterally, which in turn help further stabilize the pouch by helping to keep the front and back panels 103, 104 from shifting and twisting when hanging from the safety tether 120.

In various embodiments, outer edges of the shell 102 include a protective reinforcement or edging 144 to improve the durability of the edges. In the illustrated embodiments, the edging 144 extends along outer edges of each panel 103, 104 and also along the proximal and distal edges of the slit opening 108, for example, the distal edge D1 of the first material M1 and the proximal edge P2 of the second material M2. The edging 144 may be constructed of a material similar to material M1 or it may be a different material, as desired or appropriate.

In various embodiments, the safety tether 120 may include one or more ties, a zipper, a clip, a carabiner, one or more buttons or snaps, or any other detachable fastener, including hook and loop fasteners.

In using some embodiments of the pouch 100, a user releases the safety tether 120 from the pouch 100 by detaching the releasable fastener 122 from at least one of the two through-holes 116 so that the proximal opening 102P is accessible or can be easily widened. The user then spreads apart the proximal portions 103P, 104P of the shell 102 with his fingers to widen the proximal opening 102P leading into the pocket 130. The user deposits the mobile phone 10 into the pocket 130, with the upper short side 22 of the mobile phone leading into the pocket so that the upper short side 22 is fed first toward the distal end 102D of the pouch and the main (touch) screen 32 is facing the front panel 103 with the screen 32 being visible through the generally rectangular distal portion 103D. Notably, the mobile phone does not catch the slit opening 108 when it passes the slit opening 110 because of either the "tucked" distal edge of the material M1 or the smaller width opening of abutting materials M1 and M2 of the slit opening. The user can then reattach the releasable fastener 122 through both through-holes 116, after which event the pouch 100 carrying the mobile phone can hang freely and dangle from the safety tether whose other end is attached to the user's body or to a fixed structure. It is understood that the tethered pouch carrying the mobile phone may also be placed into a pocket or utility belt on the user's body, as desired or appropriate.

When the mobile phone emits an audio signal due to an incoming phone call or text message, the user can retrieve the pouch 100 either directly or by tugging on the tether 120, hold the pouch in generally the same manner as he would hold the mobile phone without the pouch, view the main screen through the window W1 for identity of caller or sender of the text message. Whether the releasable fastener 122 is coupled to one or both through-holes 116, there is sufficient room at the gap G1 provided by the proximal end of the interconnecting member 140 or 142 for the user to hold the pouch with the phone in one hand and insert a digit, including a thumb of the same hand, between the proximal portions 103P, 104P of the shell 102 to contact the main screen 32 and/or home button 51.

To answer a call, the user need not remove the mobile phone 10 from the pouch 100. The user may place the pouch 100 with the mobile phone to his ear in generally the same manner as he would hold the mobile phone without the pouch, and hear the caller from the speaker 36 through the apertures 117 in the second material M2 of the viewing window W1. The user may also hold the pouch with the phone with one hand and speak into the microphone 34 in the generally same manner as he would with the mobile phone without the pouch, because the proximal opening 102P between the proximal portions 103P, 104P allows voice communication and commands to the phone through the proximal opening 102P whether or not the releasable fastener 122 is coupled to both through-holes 116.

To take a photo with the forward-facing camera lens 38 or use the light source 40 as a flashlight, the user also need not remove the mobile phone 10 from the pouch as both of these optical components can function and be operated by the user in generally the same manner as with the mobile phone outside of the pouch, without obstruction by the viewing window W2 formed by the second material M2. Likewise, the light sensor 42 can operate normally without interference by the window W2. As an access opening, the transverse slit opening 108 on the back panel 104 conveniently allows the user to access the conductivity sensor by inserting a digit, especially, a finger, and provide his fingerprint, in generally the same manner as with the mobile phone outside of the pouch. As additional access openings, the gap spaces G1 and G2 may also be accessed by a user's digit to reach and contact other features and components, such as the home button, on/off switch, volume switches, etc., in generally the same manner as with a mobile phone outside of the pouch.

Overall, the front window W1 on the front panel 103 is sized and shaped to correspond to the main screen 32 on the front face 14 of the phone, and the back window W2 on the back panel 104 is sized and shaped to correspond to optical components situated on the back face 16 of the phone. It is understood that the other embodiments of the pouch 100 may provide additional windows and/or apertures on the front panel and/or the back panel, with suitable shape and size, as desired or appropriate, to allow operation of various components and features of the phone 10.

Whether the pouch 100 containing the mobile phone is purposefully dangling from a user's body or a structure, or whether the pouch 100 containing the phone has been accidentally dislodged from a user's pocket or utility belt, the free-hanging pouch 100 holding the phone can dangle with less swing and/or twisting under the force of gravity because of the configuration of the generally triangular proximal portions 103P, 104P hanging in parallel from their apices where the through-holes 116 are located. Moreover, the weight of the phone itself maintains the pouch 100 in a retention orientation where the proximal opening 102P is facing upwardly and the phone is weighted downwardly away from the opening 102P and the releasable fastener 122. After use, the mobile phone may be removed from the pouch 100 by the user decoupling the fastener 122 from the through-holes 116, separating the proximal portions 103P, 104P and removing the phone by either lifting the phone or turning the pouch 100 upside down.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A pouch comprising:
   a first panel and a second panel defining a pocket therebetween, a proximal opening leading to the pocket and a closed distal end; and
   elastic interconnecting members, each connecting the first panel and the second panel,
   wherein the first panel includes an opaque material, and the second panel includes the opaque material and a nonopaque material, the nonopaque material configured as a viewing window into the pocket,
wherein each of the first panel and the second panel has a respective through-opening, and
wherein the first panel includes a slit opening situated between the proximal opening and the closed distal end, the slit opening configured with an overlap between an edge portion of the opaque material and an edge portion of the nonopaque material.

2. The pouch of claim 1, wherein the nonopaque material is translucent plastic.

3. The pouch of claim 2, wherein the nonopaque material is configured as a first viewing window on the first panel and a second viewing window on the second panel.

4. The pouch of claim 3, wherein the nonopaque material is configured as a continuous sheet spanning the first and second viewing windows.

5. The pouch of claim 1, wherein the nonopaque material spans a portion of the first panel and a portion of the second panel.

6. The pouch of claim 1, wherein the overlap includes the edge portion of the opaque material being inside of the edge portion of the nonopaque material.

7. The pouch of claim 1, wherein the nonopaque material has a plurality of apertures configured to pass audio signals.

8. The pouch of claim 1, wherein the pouch includes access openings, each access opening configured between the distal end of the pouch and a distal end of a respective elastic interconnecting.

9. The pouch of claim 1, wherein the opaque material includes canvas.

10. The pouch of claim 1, further comprising a tether having a releasable fastener configured to couple with the through-openings.

11. The pouch of claim 1, wherein the nonopaque material is transparent plastic.

12. A pouch comprising:
a first panel and a second panel defining a pocket therebetween, a proximal opening leading to the pocket and a closed distal end, the first panel includes an opaque material, and the second panel includes a nonopaque material configured as a viewing window into the pocket, each of the first panel and the second panel has a respective through-opening, and the first panel includes a slit opening situated between the proximal opening and the closed distal end, the slit opening configured with an overlap between an edge portion of the opaque material and an edge portion of the nonopaque material, wherein the nonopaque material is transparent plastic and spans a portion of the first panel and a portion of the second panel, and wherein the overlap includes the edge portion of the opaque material being inside of the edge portion of the nonopaque material.

13. The pouch of claim 12, wherein the nonopaque material is configured as a first viewing window on the first panel and a second viewing window on the second panel.

14. The pouch of claim 13, wherein the nonopaque material is configured as a continuous sheet spanning the first and second viewing windows.

15. The pouch of claim 12, wherein the nonopaque material has a plurality of apertures configured to pass audio signals.

16. The pouch of claim 12, further comprising elastic interconnecting members, each connecting the first panel and the second panel.

17. The pouch of claim 12, wherein the first panel includes a first generally-triangular proximal portion and the second panel includes a second generally-triangular proximal portion.

18. The pouch of claim 12, wherein the nonopaque material is configured as a first viewing window in the first panel and a second viewing window in the second panel.

19. A pouch comprising:
a shell; and
a plurality of elastic interconnecting members,
wherein the shell has a first panel, and a second panel defining a pocket therebetween, a proximal opening leading to the pocket and a closed distal end, the first panel includes an opaque material, and the second panel includes a nonopaque material configured as a viewing window into the pocket, each of the first panel and the second panel has a respective through-opening, the shell includes a slit opening between the proximal opening and the closed distal end, the slit opening configured with an overlap between an edge portion of the opaque material and an edge portion of the nonopaque material, the second material is transparent plastic and spans a portion of the first panel and a portion of the second panel, and each of the elastic interconnecting members connects the first panel and the second panel.

20. The pouch of claim 19, wherein the first panel has a first proximal portion with a first apex, and the second panel has a second proximal portion with a second apex.

21. The pouch of claim 20, wherein the first proximal portion has a first through-opening and the second proximal portion has a second through-opening.

22. The pouch of claim 21, wherein the first through-opening is adjacent the first apex and the second through-opening is adjacent the second apex.

* * * * *